June 17, 1947.  G. L. DANNEHOWER ET AL  2,422,531
APPARATUS FOR CUTTING BARS, TUBES, AND THE LIKE
Filed July 20, 1943  4 Sheets-Sheet 1
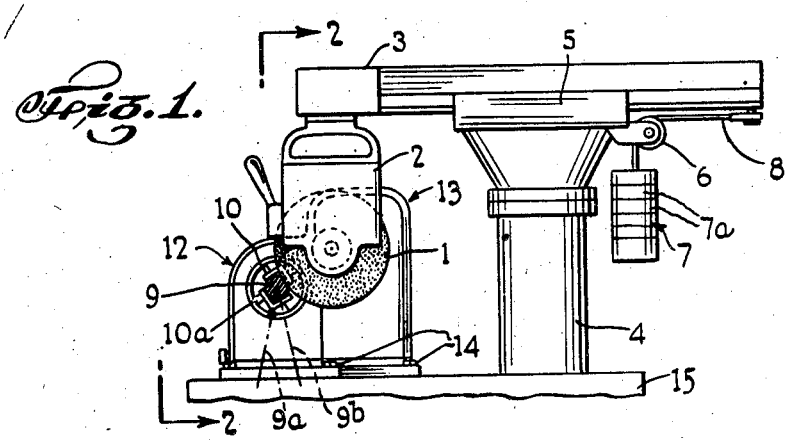
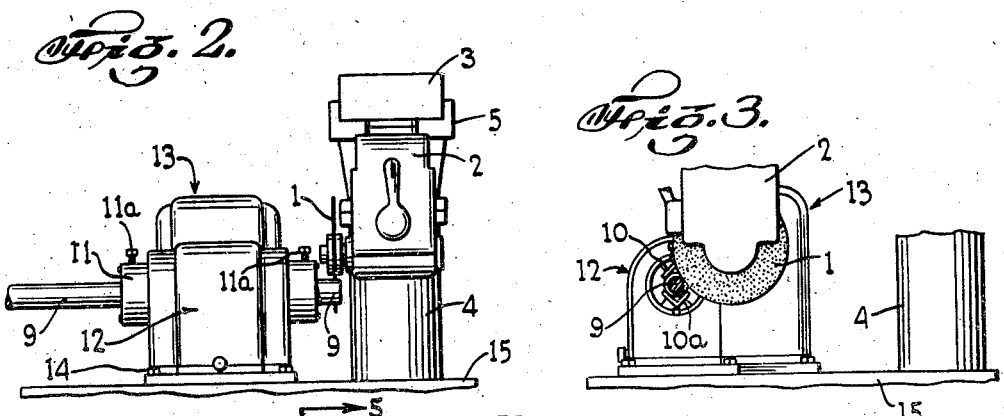
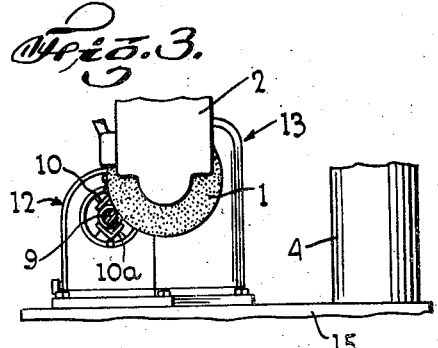
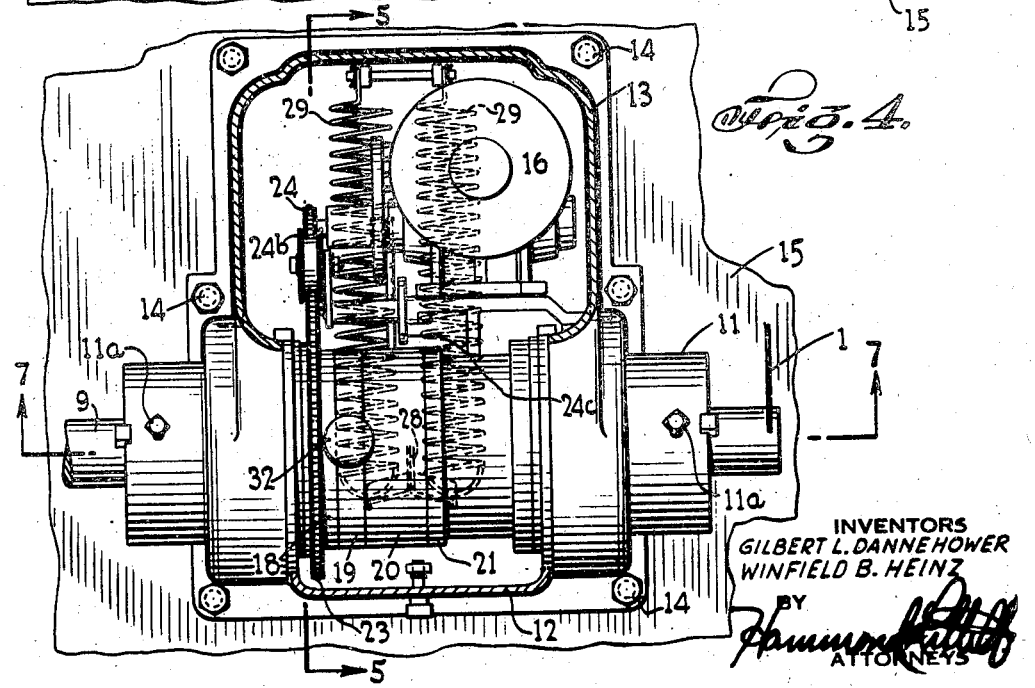
INVENTORS
GILBERT L. DANNEHOWER
WINFIELD B. HEINZ
BY
ATTORNEYS June 17, 1947.  G. L. DANNEHOWER ET AL  2,422,531
APPARATUS FOR CUTTING BARS, TUBES, AND THE LIKE
Filed July 20, 1943  4 Sheets-Sheet 2
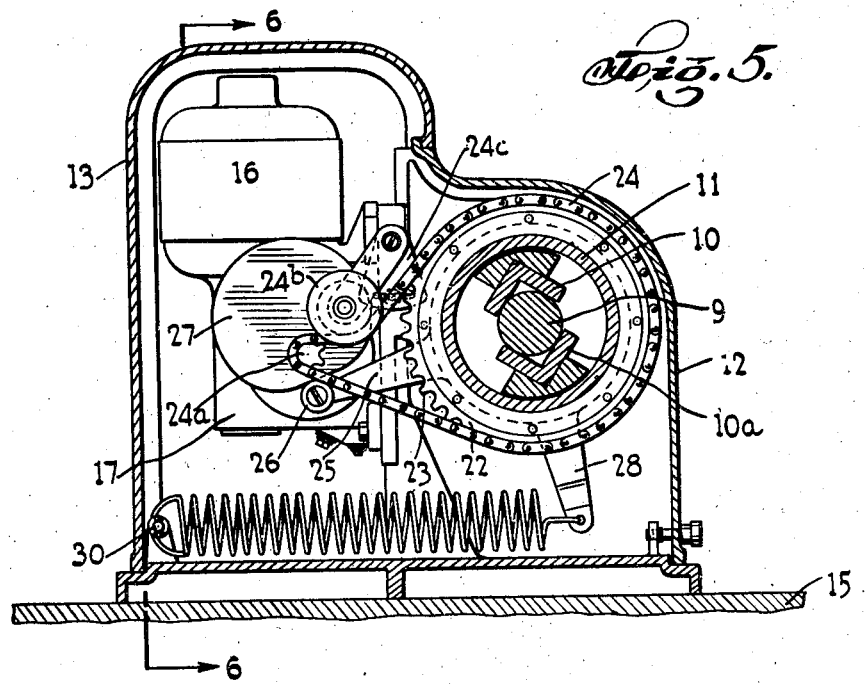
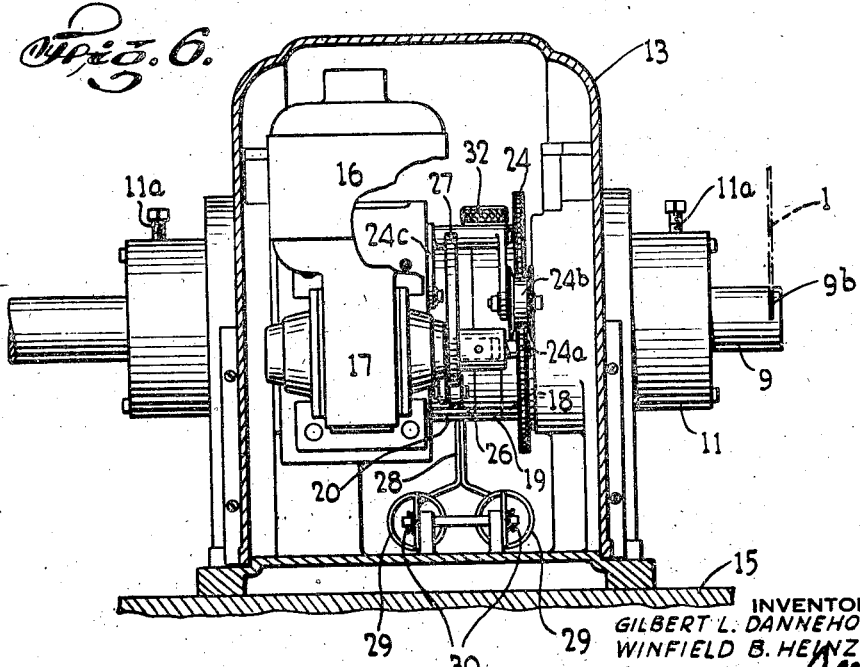
INVENTORS
GILBERT L. DANNEHOWER
WINFIELD B. HEINZ
BY
ATTORNEYS

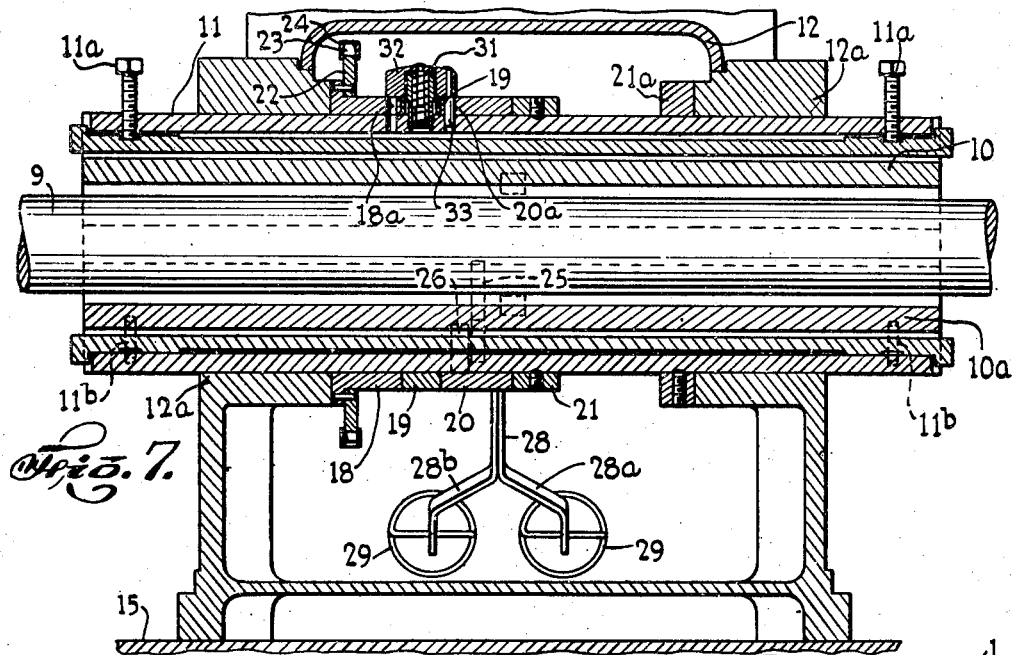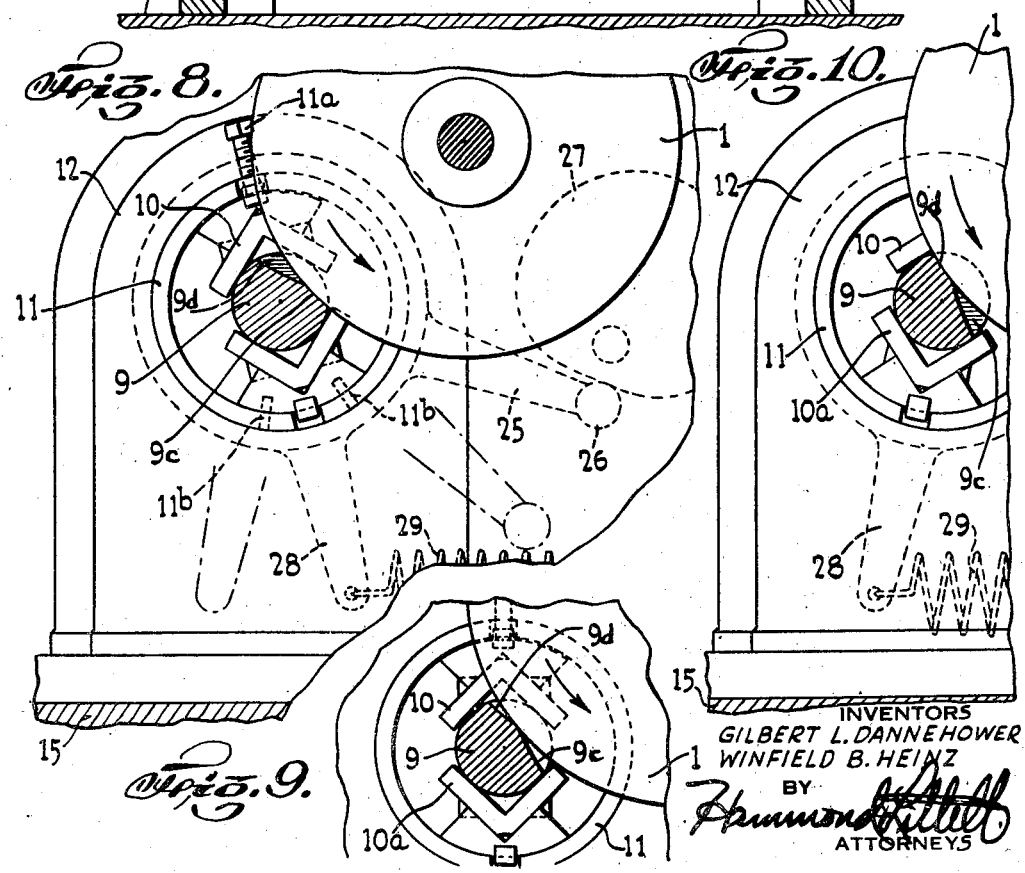

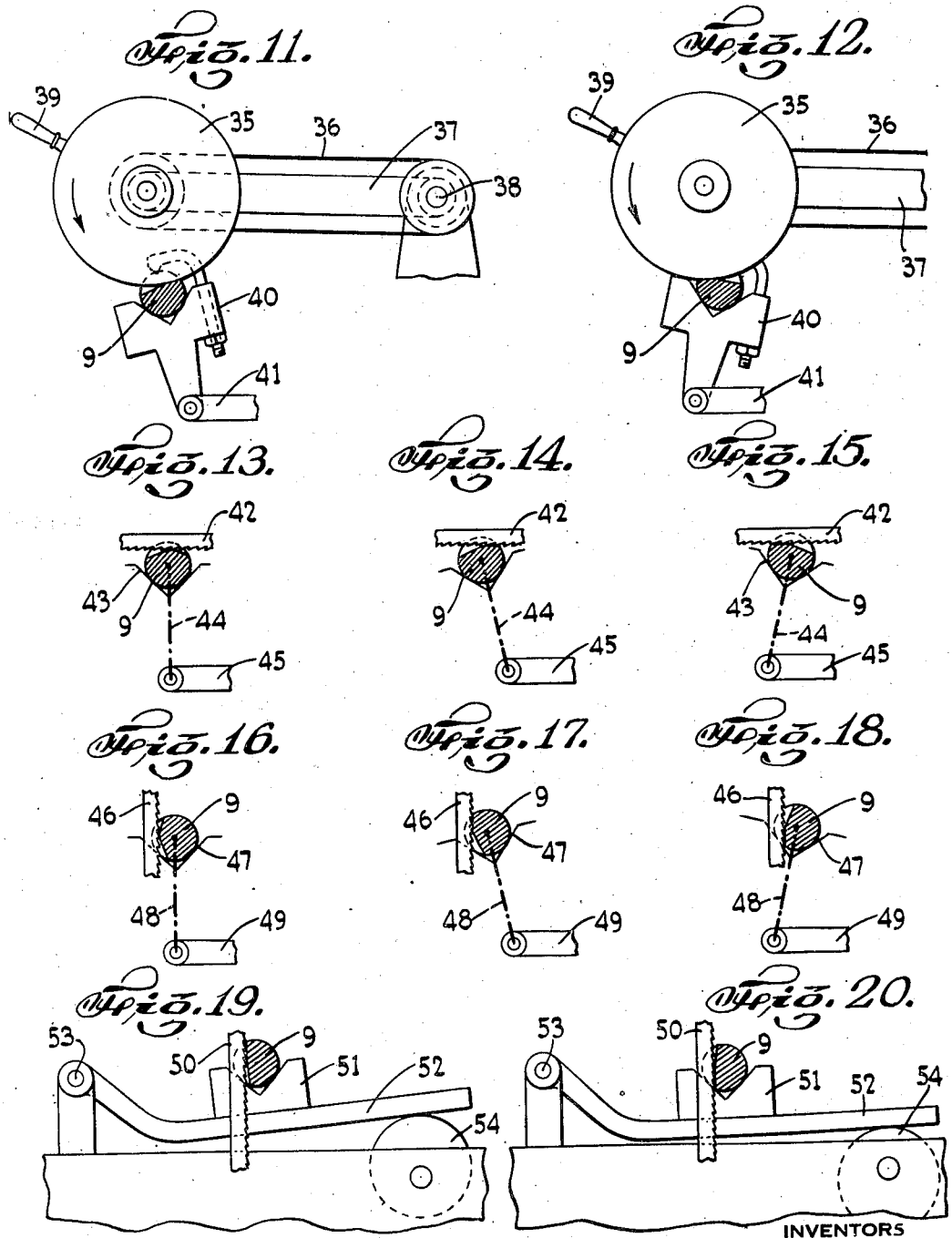

UNITED STATES PATENT OFFICE 2,422,531

APPARATUS FOR CUTTING BARS, TUBES, AND THE LIKE

Gilbert L. Dannehower, Westfield, and Winfield B. Heinz, Bound Brook, N. J.

Application July 20, 1943, Serial No. 495,470

8 Claims. (Cl. 51—105)

This invention relates to cutting, and while it will be described primarily with reference to the cutting of metals, it will be understood that the invention is applicable to the cutting of ceramics, wood, plastics and other materials, as well as metals.

In the normal cutting of rods, bars, or other shapes, it is customary to feed a saw or abrasive wheel into the bar or rod to be cut, while the bar or rod is firmly clamped against movement in a vise. In this method of cutting as the cutting tool approaches the center of the work being cut, it encounters its greatest resistance because the cut is essentially through the diameter or greatest width of the work. At the center of the work being cut, the cutting tool also generates the greatest amount of heat because the dislodged cuttings must be dragged by the cutting tool through the entire diameter or greatest width of the piece being cut before they can be relieved. Where the cutting is being done by a grinding wheel this condition, causing the generation of heat and friction, also leads to the lodging of the cuttings heated to a high heat in the pores of the grinding wheel with consequent rapid wear on the grinding wheel, and a tendency to destroy the abrasive points of the wheel. Where a saw is used for cutting, corresponding conditions of generation of heat and dulling of the tool are encountered.

It is the object of this invention to provide a method and apparatus for cutting which will reduce the wear on the cutting tool, reduce the power required to make a given cut and lead to quicker and more uniform cuts with less friction and less generation of heat than in the present methods of cutting.

Another object of our invention is to provide a method for maintaining the best cutting conditions continuously from the beginning to the end of a cut, and to insure close repetition of the best cutting conditions throughout an entire series of cuts; and also to provide means which will enable a user to utilize for a future series of cuts through a certain kind of work exactly those conditions which he has found to be best by past experience for the same kind of work.

One of these objects is accomplished by clamping the work in a movable vise or jaw, so that the work may be rotated or oscillated relative to the cutting tool. In this way substantially the longest cut which is required to be made is more nearly through the radius, rather than through the diameter or greatest width of the piece being cut. The amount of power needed to cut the piece is reduced, the cuttings are relieved much more rapidly than where the cut goes through the entire diameter or width of a rigidly clamped piece of work, and less heat is generated in the cutting operation.

The other object is accomplished by feeding the work and the cutting tool toward each other with a uniform force and permitting a floating adjustment whereby the feeding is automatically adjusted to the oscillation or rotation of the work.

Another object of the invention is to reduce the packing of the voids in the cutting tool surface by moving the work during the cutting operation and thereby maintain a high cutting rate throughout the cutting operation.

Various other objects and advantages of the invention will appear as this description proceeds.

In the embodiments chosen to illustrate applications of our invention, it will be understood that various modifications and changes may be made without departing from the principles of the invention hereinafter described.

In the preferred form of embodiment:

Figure 1 is a side elevation illustrating a machine in which a cutting tool is fed into work which is clamped and selectively oscillated or rotated in an oscillating vise;

Figure 2 is a front view substantially along the line 2—2 of Figure 1;

Figure 3 is a detail view similar to Figure 1, showing the work in a different position;

Figure 4 is a plan view of the oscillating and rotating vise with parts of the casing broken away to show the interior construction;

Figure 5 is a sectional view substantially along the line 5—5 of Figure 4;

Figure 6 is a sectional view substantially along the line 6—6 of Figure 5;

Figure 7 is a sectional view through the work clamping vise substantially along the line 7—7 of Figure 5;

Figure 8 is an enlarged end elevation illustrating different positions in the cutting operation;

Figure 9 and Figure 10 illustrate still further positions in the cutting operation;

Figure 11 is a diagrammatic view illustrating another type of cutting machine used with an oscillating and rotating work clamping vise;

Figure 12 shows another position of the work in connection with the cutting device illustrated in Figure 11;

Figures 13, 14 and 15 illustrate the method of oscillating or rotating the work while it is being cut by the use of a horizontal or substantially horizontal band saw;

Figures 16, 17 and 18 illustrate the method of cutting by oscillating or rotating the work while it is being cut with a vertical band saw; and Figures 19 and 20 illustrate another method of clamping and moving the work relative to a vertical band saw.

In the form of embodiment illustrated in Figures 1 to 10, inclusive, the cutting tool consists of a grinding wheel 1, mounted for rotation by means of electric motor or other motive power in a support 2, which is mounted on the end of a slide 3 supported on a stanchion 4 for sliding movement through a guide 5. A cord 8 is secured to the rear of the slide 3 and runs through a pulley 6 to an adjustable weight 7 so as to provide a floating feed with constant, adjustable force for feeding the cutting tool 1 forward into the work when the machine is in operation. This permits automatic adjustment between the cutting wheel and the work as the work is oscillated or rotated during cutting, and provides a uniform rate of feed.

The bar or rod 9 to be cut is clamped between the two jaws 10 and 10a of a vise which is mounted in a tubular member 11 for oscillation or rotation. By suitable mechanism later described, the vise holding the work 9 may be oscillated between the two positions indicated at 9a and 9b during the feeding of the cutting tool 1 into the work or it may be rotated, so as to change the position of the work relative to the cutting tool during the cutting operation. This has the effect, as illustrated more clearly in Figures 8, 9 and 10 of alternately bringing new faces of the work into contact with the cutting edge of the tool and of relieving the previously cut portion of the work from contact with the cutting edge of the tool, and of permitting the cuttings to clear the work and the face of the cutting tool. The floating force exerted by the weight 7 on the end of the cord 8 permits this change of position of the work without damage to the cutting wheel and also continues to feed the wheel uniformly against the face of the work while the work is being oscillated or rotated. This force may be increased or decreased by adding or removing weights 7a.

In the machine illustrated in Figure 1, the mechanism is timed to give approximately forty complete oscillations per minute, although this timing may be varied to suit the type and size of work being cut or the design of the cutting machine.

The tubular member 11 carrying clamping means 10, 10a may also be operated to rotate the work 9 as the cutting tool 1 is being fed into the work, so as to progressively expose new portions of the work to the action of the cutting tool and to relieve previously cut portions. As shown in Figure 2, the oscillating or rotating holder 11, in which the clamping jaws 10 and 10a are mounted, is carried for rotary or oscillating movement in a housing 12, and is driven for rotation or oscillation by a motor 16 mounted in the housing 12.

The entire oscillating or rotating vise, together with the driving mechanism, may be removably bolted as indicated at 14 to the base 15 of the machine which carries the cutting tool 1 and may therefore be installed either as a removable part of the cutting machine or as a permanent part.

As illustrated in greater detail in Figures 4 to 10, the clamping jaws 10, 10a, constituting the vise, are mounted in a tubular support 11 and locking pins 11a are provided by which the jaw 10 may be moved relative to the jaw 10a to permit clamping or removal of the workpiece 9 from the vise. Suitable lock pins 11b may also be provided to permit adjustment of the lower clamping jaw 10a for proper centering of the work in the vise.

Means driven from motor 16 are provided either to oscillate or to rotate the tubular member 11.

In order to effect movement of the tubular member 11 for oscillation or rotation of the work clamped within the vise jaws 10, 10a, collars 18, 19, 20 and 21 are mounted on the tubular member 11 inside the housing 12. The collar 18 has a gear wheel 22 carrying sprocket teeth 23 adapted to mesh with a sprocket chain 24 connected thereto, so as to impart continuous rotation to the work holding tube 11, when it is desired to rotate the work during cutting operations.

The collar 20 has a cam arm 25 secured thereto, carrying a cam roller 26, which cooperates with a cam 27 to give an oscillating movement to the tube 11 when it is desired to oscillate the work. A second arm 28 is also connected to the collar 20 and is split at its lower end 28a and 28b and connected to two coil springs 29 which are connected at their opposite end to an anchor 30 in the rear of the housing, so as to always keep the roller 26 in contact with the cam 27 and give the return movement when the work has been moved in one direction by the operation of the cam 27. The collar 21 serves as a locking means for locking the collars 18, 19 and 20 on the tubular member 11. The collar 19 is firmly secured to the tubular member 11 as by means of an anchoring tube 31, provided with a selector knob 32 carrying a pin 33 adapted to project through holes 18a or 20a in collars 18 and 20, and into corresponding holes in the tubular member 11, so that the collar 19 can be connected for movement either with the collar 20 or with the collar 18. Collars 18 and 20 are free to rotate or oscillate on the tubular member 11 unless they are connected to the fixed collar 19. An abutment collar 21a serves to locate the tubular member 11 within the bearings 12a of the housing 12.

When the selector knob 32 is elevated and turned, the pin 33 may be caused to project either through hole 20a in the collar 20 and into a corresponding hole in the tubular member 11, or through hole 18a in the collar 18 and a corresponding hole in the tubular member 11, so that depending upon the position of the selector knob 32 and the pin 33, the tubular member 11 may be either driven for constant rotation through the sprocket chain 24, which is connected to a sprocket 24a driven by the motor 16, or for oscillation through the cam 27, cam roller 26 and arm 25.

When the selector knob 32 is in position to cause oscillation of the tubular member 11, the collar 18 will rotate freely upon the tubular member 11, and the tubular member will be given an oscillatory movement by virtue of the fact that the collar 20 carrying the cam arm 25 and cam roller 26 is connected through the pin 33 with the collar 19 which is fixed upon the tubular member 11. The cam 27 and the sprocket 24a are constantly driven from the motor 16 through worm gearing located in housing 17. By this construction it is possible to give the tubular member 11 either an oscillatory or a continuous rotary movement as the cutting tool 1 is resiliently or floatingly fed into the work by means of the force exerted by the adjustable weight 7 attached to the end of the cord 8 which passes over the pulley 6. Any other floating feed accomplished by an adjustable force could alternatively be used in place of that illustrated by the cord 8, pulley 6 and adjustable weight 7. An idler pulley 24b, provided with an adjuster arm 24c, permits adjustment of the sprocket chain 24. Cam 27 may be given any configuration desired to impart oscillatory motion, according to a predetermined plan, to the work 9.

Figures 8, 9 and 10 illustrate various positions of the workpiece 9 as it is oscillated during the feeding of the cutting tool 1 into the work. As illustrated in Figure 8, the cutting tool 1 is taking a cut in the lower face 9c of the work 9, while the previously cut portion 9d is withdrawn from contact with the cutting tool. The cuttings are being relieved and dropped from the cut as soon as the cutting tool passes through the portion of the work being cut. As illustrated in Figure 9, the work is in the process of going through an oscillation and the actual cutting is being done on only the center portion of the cut where the cutting tool 1 is in contact with the uncut metal of the work 9.

In Figure 10, the cut is illustrated as taking place in the upper face 9d of the work 9 and the cuttings are being relieved as shown as they reach the relieved or previously cut portion 9c, which has been cut away when the cutting wheel and work were in the position illustrated in Figure 8.

It will be understood that in actual practice, the work 9 is oscillated relatively rapidly and passes from one position to the other several times during the course of the passage of the cutting tool 1 through the work 9, and that due to the resilient or floating feed of the cutting tool 1 into the work, the resiliency or give necessary to prevent breakage is present at all times; also due to the constant force of the adjustable weight 7, the best rate of feed after it has once been determined can be maintained for future cuts.

It will also be obvious that in this method of cutting, the longest cut which it is necessary for the cutting tool 1 to make in the workpiece 9 is measured approximately by the radius of the workpiece, rather than by the diameter. Consequently, at no time is the cutting wheel 1 called upon to cut through the entire thickness of the workpiece, but it takes a series of small cuts which both reduces the power necessary to cut through the workpiece 9 and also relieves the cuttings more rapidly, so that there is less generation of heat and less wear and glazing of the cutting tool, less packing of the cuttings in the voids of the tool, and, therefore, a higher cutting rate.

When the work is rotated instead of oscillated, which is usually preferred where tubular pieces are being cut, new faces of the work are progressively exposed to the action of the cutting tool and previously cut sections are relieved from contact with the cutting tool, thereby attaining many of the above advantages as will be obvious to persons skilled in the art.

While the embodiments of Figures 1 to 10 have been described in connection with the use of an abrasive grinding wheel, it will be understood that the same principles apply in connection with the use of a toothed wheel saw or other toothed cutter.

In the embodiment of cutting machine illustrated in Figures 11 and 12, the cutting tool 35 is driven by a belt 36 and mounted on an arm 37 which is movable about a pivot 38 to move the cutting tool 1 down into the work or to swing it away from the work. An adjustable weight may be attached to the handle 39 so as to give the proper degree of resilient or floating feed of the cutting tool 35 into the workpiece 9, and the proper uniformity of feed. The workpiece is clamped in a vise 40 which may be oscillated by an arm 41 to move rapidly from the position illustrated in Figure 11 to the position illustrated in Figure 12 during the cutting operation, so as to cause the cutting wheel 35 to take alternate cuts on opposite sides of the work 9, as is illustrated, respectively, in Figures 11 and 12. The vise 40 may also be rotated to cause rotation of the work 9.

Figures 13, 14 and 15 illustrate the same principle of cutting applied in a machine using a horizontal band saw. In this illustration the saw 42 is driven by any suitable driving means in a substantially horizontal plane, and the work 9 is clamped in a vise, of which one portion is illustrated at 43, which vise is mounted by means of an arm 44 and link 45 to oscillate the work piece between the three positions illustrated in Figures 13, 14 and 15, or may be mounted to rotate the workpiece. By oscillating the work in this manner, the longest cut which it is necessary for the saw 42 to make is approximately the radius of the work piece 9. Consequently, the saw 42 can be driven at higher speed and with less power, and the cuttings do not have to be dragged through a portion of the cut which is substantially longer than a radius of the work being cut. The cuttings are rapidly relieved and do not clog or fill the voids in the cutting tool so that a high rate of cutting is maintained. With square or polygonal stock, the method of cutting is the same and the length of the individual cuts is reduced in substantially the same proportions as in the cutting of round stock.

In Figures 16, 17 and 18, the same method of cutting is illustrated in connection with a machine having a vertical band saw 46. In this illustration, the work 9 is clamped in a vise, one member of which is illustrated at 47, and by means of an arm 48 and link 49, the workpiece 9 may be oscillated between the three positions illustrated in Figures 16, 17 and 18 to bring different portions of the work into contact with the saw and permit rapid cutting of the workpiece. If desired, the workpiece 9 may be rotated instead of oscillated. A floating or resilient feed of the cutting tool with the work is preferably provided under the influence of an adjustable weight which provides a uniform rate of feeding.

In Figures 19 and 20 another method of moving the workpiece 9 relative to the cutting member 50 is illustrated. In this embodiment of the invention, the workpiece 9 is clamped in a vise, one member of which is illustrated at 51, and the vise is mounted on an arm 52, which is pivoted at 53 to the bed of the cutting machine. A cam 54 driven by any suitable source of power is caused to raise and lower the arm 52 to change the angle of the workpiece 9 relative to the cutting member 50, as the cutting member is fed into the work, so that the cut will be taken at a different angle and a series of small cuts, as distinguished from large cuts, will be taken from the workpiece 9. The cam 54 may be given any desired configuration. The cuttings will also be rapidly relieved as described in connection with the previous embodiments.

Instead of locating the work 9 in the path of the cutting tool so that the tool moves into the work on substantially the center line of the work and takes substantially equal cuts in the upper and lower parts of the work as the work is oscillated, the work may be located so that the center line of the work is out of line of movement of the cutting tool so that a larger cut is taken in one position of the work than in the other, and instead of feeding the cutting tool into the work, the work may be simultaneously oscillated or rotated and fed into a cutting tool mounted in a fixed position.

While one complete embodiment of the invention has been described and several diagrammatic embodiments have been illustrated, it will be understood that various other embodiments of cutting machines employing our method of cutting may be provided within the spirit of our invention and the scope of the claims attached hereto.

We claim:

1. In a cutoff machine for cutting off bars, rods, tubes and the like, a cutting wheel, means to rotate the cutting wheel, means to feed the cutting wheel and the work relative to each other to cause the cutting wheel to move into the work, means to move the work during the cutting operation to present new surfaces of the work to the cutting wheel, comprising a cylindrical work holder, means to clamp the work in said holder, means to rotate said work holder, means to oscillate said work holder, means to select either oscillation or rotation for said work holder, and means giving floating adjustment of the cutting wheel relative to the work during said feeding.

2. In a cutoff machine for cutting off bars, rods, tubes and the like, an abrasive cutting wheel, means to rotate the cutting wheel, means to move the cutting wheel and the work relative to each other to cause the cutting wheel to move into the work, means to rotate the work during the cutting operation to present new surfaces of the work to the cutting wheel, means giving floating adjustment of the cutting wheel relative to the work during said rotation, and means to shift from rotation to oscillation of the work.

3. In a cutoff machine for cutting off bars, rods, tubes and the like, a cutting tool, means to rotate the cutting tool, means to feed the cutting tool and the work relative to each other to cause the cutting tool to move into the work, means to rotate the work during the cutting operation to present new surfaces of the work to the cutting tool, means giving floating adjustment of the cutting tool relative to the work during said feeding and said rotation, and means to shift from rotation to oscillation of the work.

4. In a cutoff machine for cutting off bars, rods, tubes and the like, a power driven cutting tool, means to drive the cutting tool, means to move the cutting tool and the work relative to each other to cause the cutting tool to feed into the work, means to move the work around its center during the cutting operation to present new surfaces of the work to the cutting tool, comprising a cylindrical member in which the work is clamped, bearings in which the cylindrical member rotates, a loose collar on said cylindrical member and means to rotate said collar, a fixed collar on said cylindrical member and a second loose collar on said cylindrical member, means to oscillate said second loose collar, means to selectively connect the fixed collar with either of the loose collars, and means giving floating adjustment of the cutting tool relative to the work during the cutting operation.

5. In a cutoff machine for cutting off bars, rods, tubes and the like, a cutting tool, means to rotate the cutting tool, means to move the cutting tool and the work relative to each other to cause the cutting tool to move into the work, means to move the work around its center during the cutting operation to present new surfaces of the work to the cutting tool, comprising a cylindrical member in which the work is clamped, bearings in which the cylindrical member rotates, a loose collar on said cylindrical member and means to rotate said collar, a fixed collar on said cylindrical member and a second loose collar on said cylindrical member, means to oscillate said second loose collar, means to selectively connect the fixed collar with either of the loose collars, and means giving floating movement of the cutting tool relative to the work during said movement of the work around its center comprising a weight, cord and pulleys floatingly feeding the cutting tool into the work.

6. In a cutoff machine for cutting off bars, rods, tubes, and the like, an abrasive cutting wheel, means adapted to urge the wheel to feed into the work, a floating adjustment for said wheel, whereby the wheel may adjust its position relative to changes in position of the work, and means to change the position of the work during cutting, comprising a work holder, means to clamp the work in the work holder, a rotatable collar loosely mounted on said work holder, means to rotate said collar, a second collar on said work holder and means to oscillate said second collar, and means to connect either of said collars to the work holder to impart motion thereto corresponding to the motion of said collar.

7. In a cutoff machine of the type described, an abrasive cutting wheel, means to rotate the cutting wheel, means to move the wheel toward the work to be cut with a floating movement and a clamping means for the work, means whereby the clamping means can be given a rotary or an oscillatory movement, and means to secure the clamping means to either the rotary or the oscillatory means.

8. In a cutoff machine for cutting off bars, rods, tubes and the like, an abrasive cutting wheel, means to rotate the cutting wheel, means to move the cutting wheel and the work relative to each other to cause the cutting wheel to move into the work, means to continuously oscillate the work during the cutting operation to continuously present new surfaces of the work to the cutting wheel, and means giving floating movement of the cutting wheel relative to the work during said oscillation of the work comprising a weight, cord and pulleys floatingly feeding the cutting wheel into the work with a constant uniform pressure.

GILBERT L. DANNEHOWER.
WINFIELD B. HEINZ.

REFERENCES CITED

The following references are of record in the file of this patent:

UNITED STATES PATENTS

| Number | Name | Date |
|---|---|---|
| 2,162,848 | Kulp | June 20, 1939 |
| 344,777 | Griswold | June 29, 1886 |
| 2,232,387 | Hardy | Feb. 18, 1941 |
| 2,327,863 | Bovard | Aug. 24, 1943 |
| 2,304,238 | Broughton | Dec. 8, 1942 |
| 2,318,050 | Boynton | May 4, 1943 |
| 1,640,832 | Jacobowitz | Aug. 30, 1927 |
| 1,226,329 | Hansen | May 15, 1917 |
| 1,254,253 | Marchant | Jan. 22, 1918 |

FOREIGN PATENTS

| Number | Country | Date |
|---|---|---|
| 23,659 | Great Britain | Dec. 7, 1914 |
| 13,361 | Great Britain | Sept. 20, 1915 |